United States Patent [19]

Kishimoto et al.

[11] Patent Number: 4,866,551
[45] Date of Patent: Sep. 12, 1989

[54] CASSETTE LOADING APPARATUS

[75] Inventors: Yoshinobu Kishimoto, Takarazuka; Takashi Ando, Neyagawa; Harumi Kudo, Moriguchi, all of Japan

[73] Assignee: Matsushita Electric Industrial Co., Ltd., Kadoma, Japan

[21] Appl. No.: 108,593

[22] Filed: Oct. 15, 1987

[30] Foreign Application Priority Data

Oct. 17, 1986 [JP] Japan .............................. 61-247811
Feb. 18, 1987 [JP] Japan .............................. 62-35001

[51] Int. Cl.⁴ .................. G11B 15/675; G11B 17/022
[52] U.S. Cl. .............................. 360/96.5; 360/99.06
[58] Field of Search ...................... 360/96.5, 93, 96.6, 360/96.1, 97–99

[56] References Cited

U.S. PATENT DOCUMENTS

4,546,396 10/1985 Schatteman ...................... 360/96.5
4,723,185 2/1988 Maeda .............................. 360/96.5

Primary Examiner—John H. Wolff
Assistant Examiner—Matthew J. Bussan
Attorney, Agent, or Firm—Spencer & Frank

[57] ABSTRACT

A cassette loading apparatus has a clutch mechanism provided with a first sliding member which is capable of moving horizontally along a guide member provided on one side of a side plate; a second sliding member having an elongated hole with which a projection provided on the first sliding member is engaged, and mounted such as to slide with respect to the first sliding member by being connected to the first sliding member by a resilient member; and an auxiliary sliding member resiliently engaged with the second resilient member having tension which is greater than that of the first resilient member.

7 Claims, 7 Drawing Sheets

CASSETTE LOADING APPARATUS

BACKGROUND OF THE INVENTION

FIELD OF THE INVENTION

The present invention relates to a cassette loading apparatus of a front loading system which can be used in a magnetic recording and reproducing system, such as a video cassette recorder.

STATEMENT OF THE RELATED ART

In recent years, a front loading system in which a cassette is inserted at a front surface has been mainly used for the cassette loading apparatus of a magnetic recording and reproducing system, such as a video cassette recorder. Description will be made below of an example of a conventional cassette loading apparatus with reference to FIG. 1.

Figure 1:
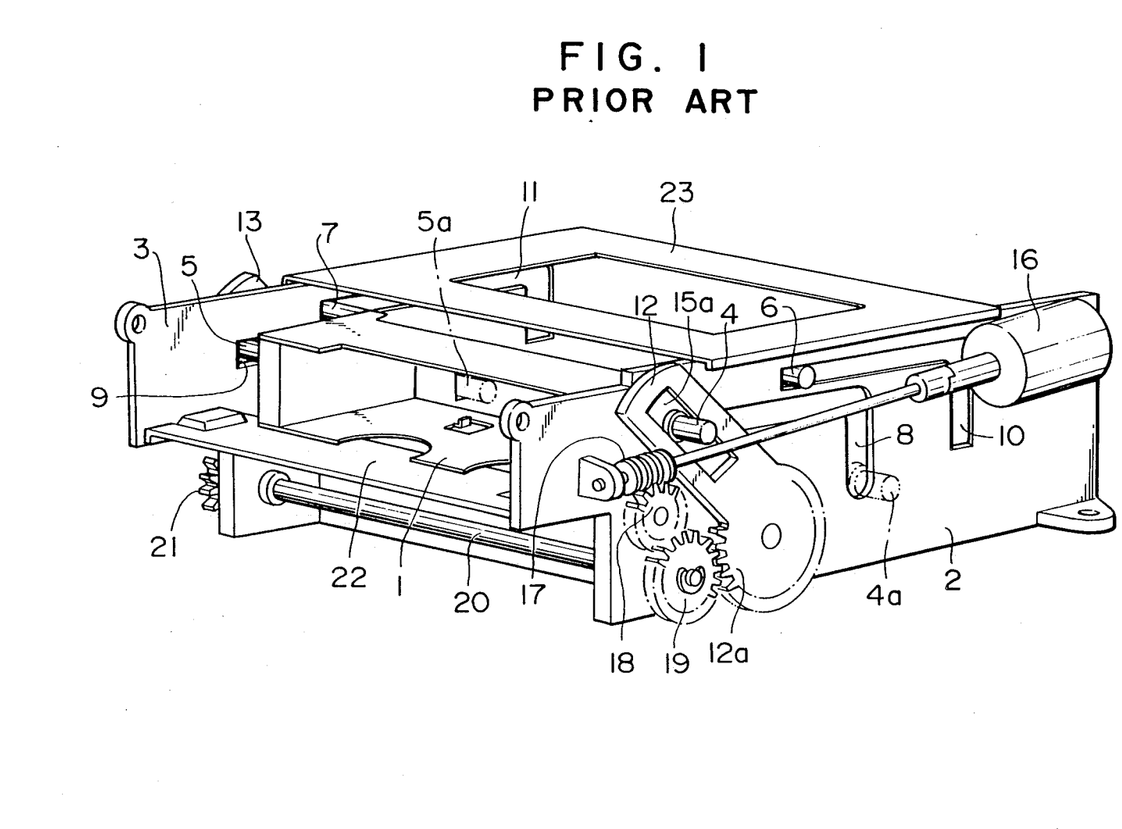
FIG. 1 is a perspective view of a conventional cassette loading apparatus.

FIG. 1 is 1 perspective view of a conventional cassette loading apparatus. In FIG. 1, a cassette holder unit 1 detachably retains a cassette which contains magnetic tape. Side frames 2, 3 (hereafter referred to as the "side plates") are disposed on both sides of the cassette holder unit 1 and are provided with L-shaped guide grooves 8, 9 and 10, 11 with which pins 4, 5 and 6, 7, projecting respectively from both ends of the cassette holder unit 1, are engaged.

Drive arms 12, 13 respectively have guide holes 15a for moving the pins 4, 5 to the positions, 4a, 5a indicated by dotted lines, and are rotatably supported on both sides of the side plates 2, 3 respectively. A drive motor 16 drives an intermediate gear 19 via a worm gear 17 and a worm wheel 18. The intermediate gear 19 is fixed to one end portion of a shaft 20 rotatably supported by the side plates 2, 3 and meshes with a gear portion 12a formed in a proximal portion of the drive arm 12. Meanwhile, the other intermediate gear 21 is secured to the other end portion of the shaft 20, and this intermediate gear 21 meshes with a gear portion of the other drive arm 13. A cassette guide 22 guides the insertion of the cassette into the cassette holder unit 1 and connects the side plates 2, 3. A top plate 23 is connected to the side plates 2, 3 from the top, and is provided in such a manner as to maintain the rigidity of the overall cassette loading apparatus.

As is apparent from the above-described arrangement, the path for transmitting the power from the drive motor 16 to the cassette holder unit 1 is arranged in the order of the drive motor 16, the worm gear 17, the worm wheel 18, the intermediate gears 19, 21, the drive arms 12, 13, the pins 4, 5, and the cassette holder unit 1.

With the above-described arrangement, however, when the cassette is manually inserted, there has been a drawback in that, if the cassette is pushed in more than is required or impulsively after the automatic operation of pulling in of the cassette holder unit 1 by the drive motor has been commenced, a load corresponding to the pushing force is applied to the parts constituting the power transmission path. This results in damage to some parts of the power transmission path and may cause disengagement of these parts.

SUMMARY OF THE INVENTION

Accordingly, an object of the present invention is to provide a cassette loading apparatus which is capable of imparting the feel of a click at the time of insertion of the cassette. This accomplished by instantaneously increasing the inserting force necessary for inserting the cassette at a desired inserting stroke, in such a manner as to provide an artificial restriction to the stroke of manually pushing in the cassette. The invention prevents the cassette from being pushed in with more force than required, and which, at the time when the cassette is inserted more than required or impulsively, does not allow an overload to be applied to the parts constituting the power transmission path thereby preventing damage and disengagement of those parts when the cassette is inserted with too much force.

The above and other objects and features of the invention will appear in the following description and appended claims. Reference is made to the accompanying drawings which form a part of this specification wherein like reference characters designate corresponding parts in the several views.

DETAILED DESCRIPTION OF THE PREFERRED EMBODIMENT

Figure 2:
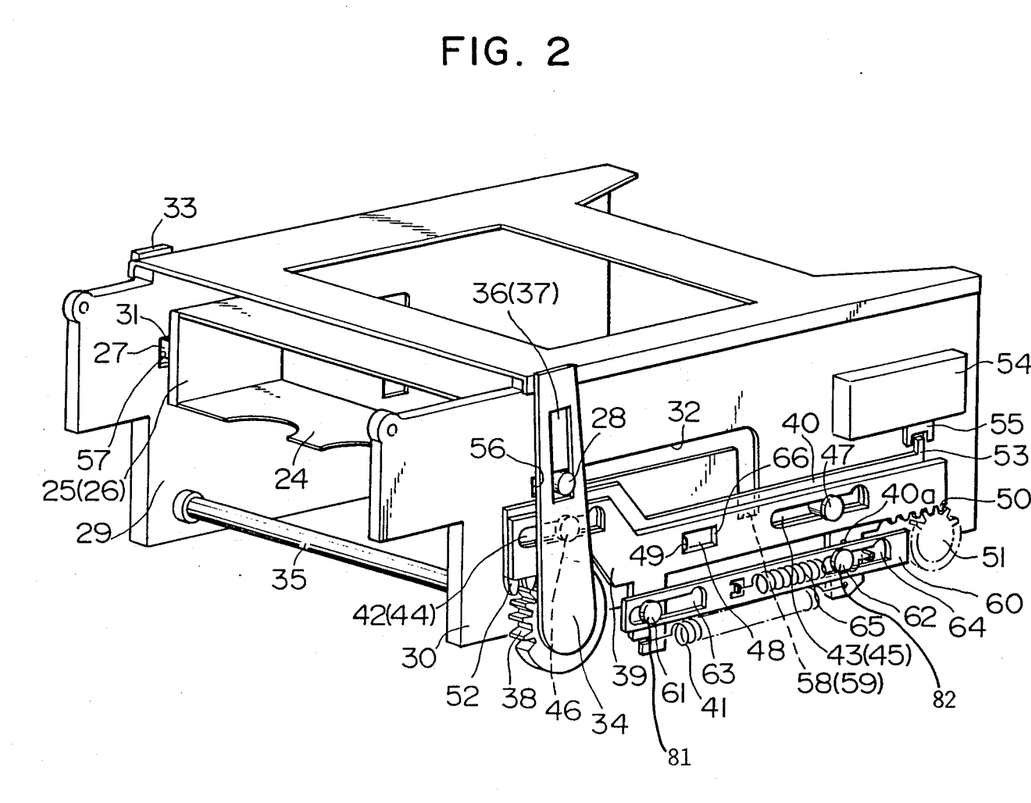
FIG. 2 is a perspective view of a cassette loading apparatus illustrating an embodiment of the present invention.

FIG. 2 is a perspective view of a cassette loading apparatus in accordance with an embodiment of the present invention. In FIG. 2, there is shown a cassette, holder 24 adapted to detachably hold a cassette (not shown) accommodating a magnetic tape; side wall members 25, 26 are arranged integrally on both sides of the cassette holder 24; guide pins 27, 28 are provided respectively projecting from the side wall members 25, 26; side plates 29, 30 are disposed on both sides of the cassette holder 24; L-shaped guide grooves 31, 32 are respectively provided on the side plates 29, 30 and are constituted by two to three grooves, the guide pins 27, 28 being engaged therewith, respectively. Incidentally, it goes without saying that the guide pins 27, 28 are provided in correspondence with the number of L-shaped guide grooves 31, 32. Drive arms 33, 34 are connected to each other by a shaft 35 and are rotatably supported by the side plates 29, 30. The main guide pins 27, 28 on the side wall members 25, 26 of the cassette holder 24 are respectively engaged with guide grooves 36, 37 provided in tip portions of the drive arms 33, 34. A gear 38 is formed integrally with one drive arm 34 such as to be concentric with the shaft 35. Reference numeral 39 denotes a second sliding member, while reference numeral 40 denotes a first sliding member connected integrally with the second sliding member 39 by means of a resilient member 41. First and second elongated guide holes 42, 43 are provided in the second sliding member 39, while third and fourth elongated guide holes 44, 45 are provided in the first sliding member 40. Guide members 46, 47 are inserted in the first and third elongated guide holes 42, 44 and the second and fourth elongated guide holes 43, 45 respectively, and are adapted to guide the linearly reciprocating motion of the first and second sliding members 40, 39. A retaining hole 48 is provided in the second sliding member 39, while a retaining projection 49 is provided on the first sliding member 40 and is inserted in such a manner as to be retained by some portion of the retaining hole 48. A first gear portion 50 is provided on the second sliding portion 39, and is meshed with a drive gear 51, which is a driving source for this cassette loading apparatus. A second gear portion 52 is provided on the first sliding member 40, and is meshed with the gear 38 which is provided integrally on the drive arm 34. A projection 53 is provided on the first sliding member 40, and is engaged with an actuator 55 of a slide switch 54 secured to the side plate 30.

As described above, the first and second sliding members 40, 39 are constituted as sliding members which perform the movement of the cassette by transmitting the power from the drive motor.

Description will now be made of an auxiliary sliding member provided for the slide members. An auxiliary sliding member 60 has first and second elongated holes 63, 64 in which horizontal movement is restricted by the guide pins 61, 62 having flange portions 81 and 82. The guide pins 61 and 62 are calked and secured to second sliding member 39 and the first sliding member 40, respectively. The auxiliary sliding member 60 also includes a second resilient member 65 which functions by being secured to the first sliding member 40 at one end thereof. The auxiliary sliding member 60 is capable of sliding on a projection 40a formed integrally with the first sliding member 40 and a projection 39a (FIGS. 3-5) formed integrally with the second sliding member 39.

Description will now be made of the operation of the cassette loading apparatus thus constructed, particularly the operation of a clutch mechanism constituted by the sliding members including the auxiliary sliding member.

Figure 3:
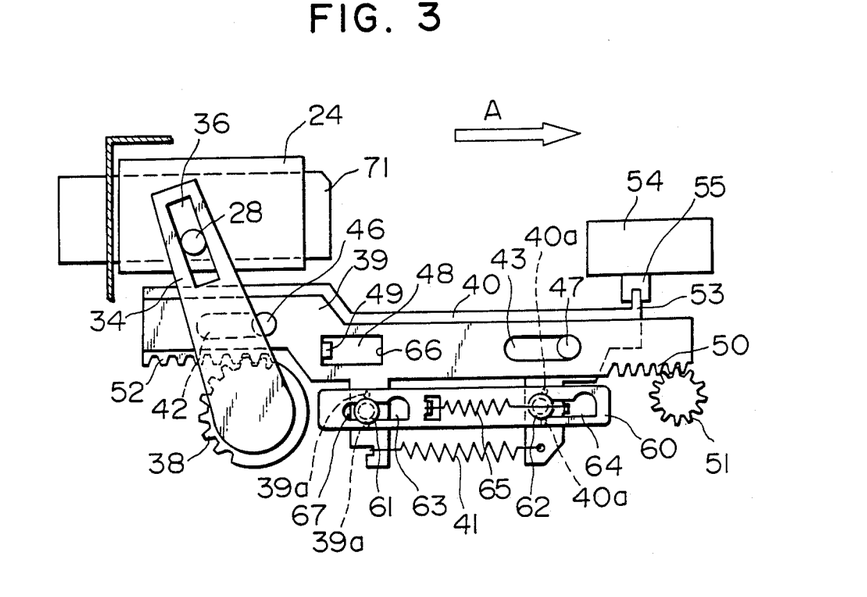
FIGS. 3 to 5 are side elevational views of a clutch mechanism explaining the operation of the apparatus shown in FIG. 2.
Figure 4:
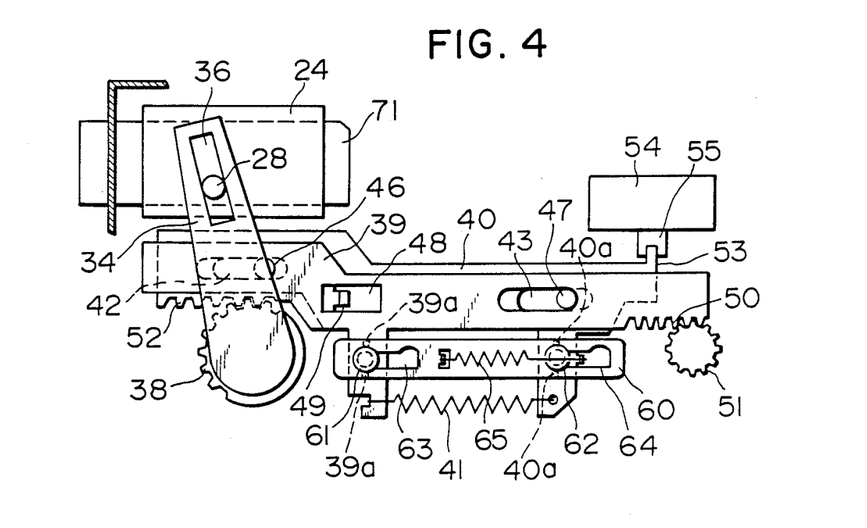

FIGS. 3 and 4 are schematic diagrams of the apparatus at the time when the cassette holder 24 is in its cassette loading and unloading position. At this time, the guide pins 27, 28 provided on the side wall members 25, 26 of the cassette holder 24 are in positions of contact with side surfaces 56, 57 of the L-shaped guide grooves 31, 32 provided in the side plates 29, 30. At the time when the guide pins 27, 28 are in positions of contact with the other end surfaces 58, 59 of the L-shaped guide grooves 31, 32, the cassette 71 is in the position of being reproduced and recorded. In FIG. 3, if the cassette 71 is pushed in, the cassette holder 24 for holding the cassette 71 moves, and when the drive arm 34 rotates clockwise via the guide pin 28 provided on the side wall member of the cassette holder 24, the first sliding member 40 which is engaged with the drive arm 34 at the second gear portion 52 thereof moves in the direction of A. At this juncture, since the drive gear 51 is stopped until the slide switch 54 is turned on, the second sliding member 39 connected to the drive gear 51 remains stationary. Accordingly, the first resilient member 41 is stretched in relation to the first sliding member 40 which has moved relative to the stationary second sliding member 39, as shown in FIG. 4. Furthermore, since the second resilient member 65 engaged between the first sliding member 40 and the auxiliary sliding member 60 is given tension which is greater than that of the first resilient member 41 and remains thus engaged, even if the first sliding member 40 moves, the second resilient member 65 does not become stretched. Accordingly, the auxiliary sliding member 60 moves by the same amount, that is, has the same stroke as that of the first sliding member 40, and moves until an end portion of the first elongated hole 63 in the auxiliary sliding member 60 comes into contact with the guide pin 61 before it stops, as shown in FIG. 4.

Figure 5:
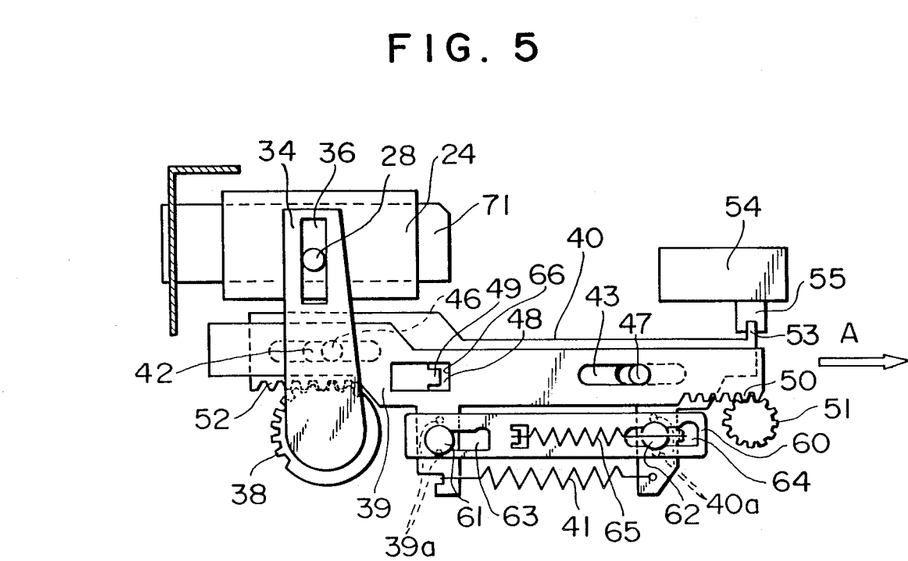

Accordingly, in the state shown in FIG. 4, only the resilient tension of the first resilient member 41 alone is applied to the clutch mechanism constituted by the first sliding member 40, the second sliding member 39, and the auxiliary sliding member 60 as well as the first and second resilient members 41, 65. If the cassette 71 is then pushed in, as shown in FIG. 5, basically speaking, the first sliding member 40 moves further, and the slide switch 54 is turned on by engagement between the projection 53 formed on the first sliding member 40 and the actuator 55. Consequently, the drive gear 51 rotates clockwise, which in turn causes the second sliding member 39 to move in the same direction as the moving direction of the first sliding member 40. Meanwhile, the engaging projection 49 provided on the first sliding member 40 is brought into contact with a portion of the engaging hole 48 provided in the second sliding member 39, and the second sliding member 39 and the first sliding member 40 are connected to each other and move in the direction of the arrow A by means of the drive gear 51. As the first sliding member 40 moves, the drive arm 34 rotates clockwise with the shaft 35 as a center by engagement between the second gear portion 52 and the gear 38. As the drive arm 34 rotates, the guide pin 28 moves along the L-shaped guide groove 32, and abuts against one end surface 58 of the guide groove 32. At this time, the first sliding member 40 is moved to a position at which the slide switch 54 is turned off by the engagement between the projection 53 and the actuator 55 so as to stop the motor, thereby stopping the rotation of the drive gear 51. The position in this state is the cassette loaded position in which the reproduction and recording of the cassette 71 is possible.

However, in cases where the action of pushing in the cassette 71 is effected at a high speed and with a large force relative to the time of actual operation by driving the motor, it is considered that the second sliding member 39 is actually in the same state as that of a stop owing to a driving loss or the like until the first sliding member 40 reaches the stroke of moving from the position shown in FIG. 4 to the position shown in FIG. 5. At this juncture, as shown in FIG. 5, the first sliding member 40 moves over the position shown in FIG. 4, and the auxiliary sliding member 60 remains stationary with the left end of the first elongated hole 63 abutting against the guide pin 61 calked and secured to the second sliding member 39. Consequently, the guide pin 62 calked and secured to the first sliding member 40 slides along the second elongated hole 64. At this stage, the second resilient member 65 with one end thereof secured to the first sliding member 40 extends for the first time. Accordingly, in the state shown in FIG. 5, since the resilient members 41, 65 engaged with the first sliding member 40 act in opposition to the second sliding member 39 which is at a standstill, a tensile load which is much greater than the tension of the resilient member shown in FIG. 4 is applied to the first sliding member 40. Moreover, this load is applied instantaneously at a position of a desired sliding stroke. Accordingly, at the time when the user pushes in the cassette 71, the user immediately feels an increase in the inserting force by virtue of a reactionary force thereof. Conceivably, this is because the retaining projection 49 and the retaining hole 48 which restrict the sliding stroke between the first sliding member 40 and the second sliding member 39 functions as if the right wall 66 of the retaining hole 48 exists at the midpoint thereof such as to restrict the amount of the sliding stroke.

If the right wall 66 actually exists at the position shown in FIG. 5, and the user continues to push in the cassette 71, then the second sliding member 39 and the first sliding member 40 mechanically move as a unit in the stroke from the position shown in FIG. 5. Therefore, the drive gear 51 receives a tangential force from an overload resulting from an abnormal inserting force and becomes incapable of following the load if the load exceeds a certain level, eventually causing damage to the drive gear 51 and other parts. Hence, this right wall 66 should ideally be located in the retaining hole 48 which is elongated as much as possible. This arrangement is desirable in view of the fact that the right wall 66 also functions as a clutch. In other words, in this embodiment, this engaging hole 48 is set to a stroke which is greater than a value corresponding to the horizontal movement of the cassette 71. In addition, as already mentioned, the resilient load increases midway in the sliding stroke, but this is imparted to the user as a click, allowing the user to think that it is unnecessary to insert the cassette 71 any further. As a result, an inserting stroke which is more than necessary is reduced, so that it becomes possible to protect the driving section which is relatively weak in terms of strength.

Incidentally, there are advantages in that the resilient tension of the second resilient member 65 can be determined freely in accordance with the degree of the click, and that an amount of the inserting stroke and an inserting load for obtaining a click can be obtained, as desired, by arbitrarily determining a gap 67 of the first elongated hole 63 of the auxiliary sliding member 60. Thus, this gap 67 constitutes a space which is very significant, and has the function of reducing the inserting force to a fixed range and thereby protecting the driving section.

Description will now be made of the operation of the cassette loading apparatus at the time of unloading the cassette.

First, if a cassette unloading switch (not shown) is turned on, the drive gear 51 rotates counterclockwise, which in turn causes the second sliding member 39 to move in the direction opposite to the direction of the arrow A, and the first sliding member 40 then moves together with the second sliding member 39 in the same direction by means of the tension of the first resilient member 41. As a result of the movement of the second sliding member 39, the drive arm 34 rotates counterclockwise with the shaft 35 as a center via the second gear portion 52 and the gear 38. The guide pin 28 moves along the L-shaped guide groove 32 by the counterclockwise rotation of the drive arm 34, and moves until it is brought into contact with the end surface 56 of L-shaped guide groove 32. At this time, the slide switch 54 is turned off, thereby stopping the rotation of the drive gear 51. Through the above-described operation, the cassette 71 moves to the position shown in FIG. 3.

Figure 6:
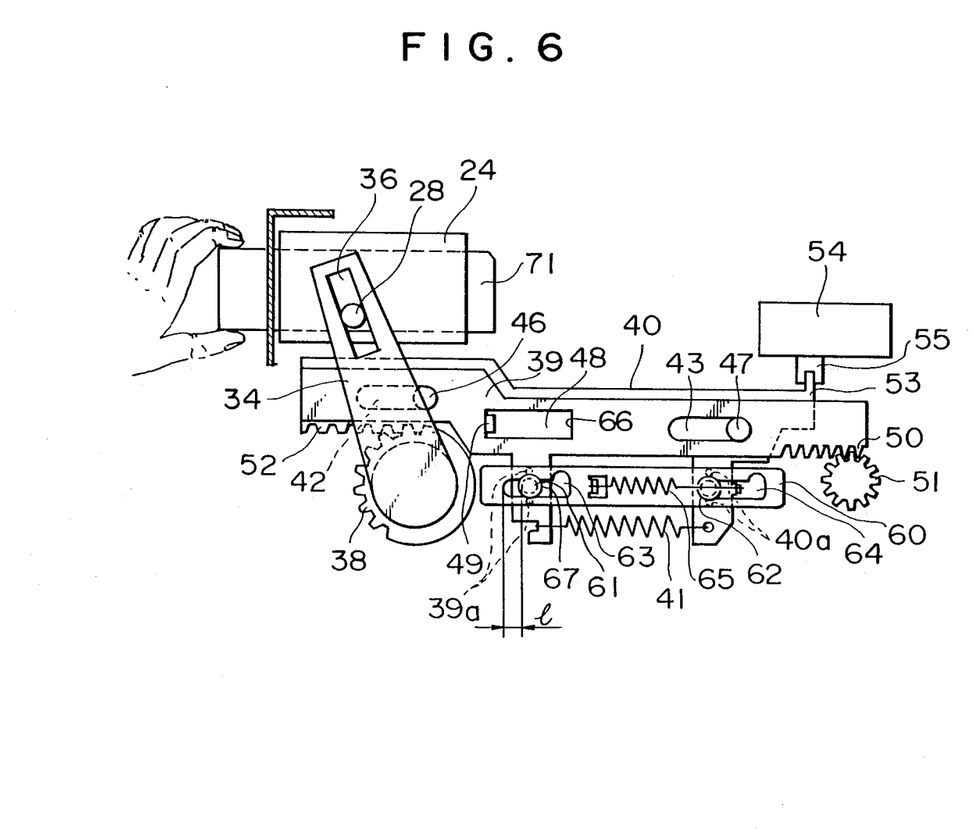
FIGS. 6 and 7 are side elevational views of the clutch mechanism explaining the operation of another embodiment of the present invention.

FIG. 6 is a schematic side elevational view illustrating a state at the time of ejecting the cassette, and particularly shows a state immediately before completing the ejection operation. In this state, as shown in FIG. 6, if it is assumed that the user holds the cassette 71 with a hand, the cassette holder 24 holding the cassette 71 and the drive arm 34 engaging with the guide pin 28 provided on the side wall member 26 stop. Furthermore, the..operation of the first sliding member 40 having the second gear portion 52 meshing with the gear 38 provided on the drive arm 34 also stops. In other words, it can be considered that the cassette 71 and the first sliding member 40 undergo a series of operations.

If an electrically ejecting operation is continued in this state, the second sliding member 39 moves in the ejecting direction in opposition to the first resilient member 41. Since this horizontally ejecting force is sufficiently greater than the resilience force of the first resilient member 41, only the second sliding member 39 operates. In other words, the auxiliary sliding member 60 and the second resilient member 65 are at a standstill.

Figure 7:
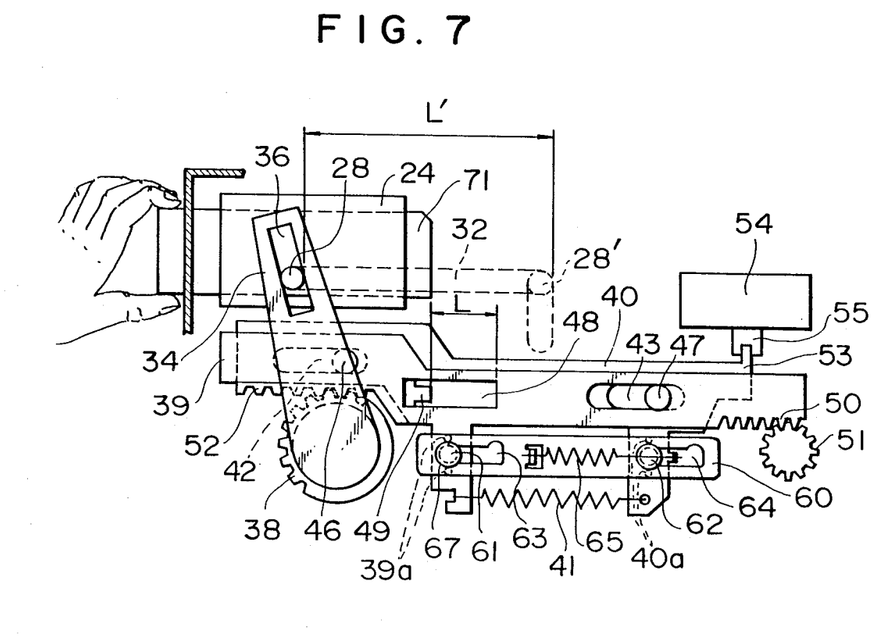

As a result, as shown in FIG. 6 and FIG. 7, the length l of the gap 67, which is between the first elongated hole 63 formed in the auxiliary sliding member 60 and the guide pin 61 calked and secured to the second sliding member 39, becomes nil. At this time, a gap L between the retaining projection 49 of the first sliding member 40 and the retaining hole 48 formed in the second sliding member 39 is also reduced, as shown in FIG. 7. This amount of reduction corresponds to the length l of the gap 67.

In this state, if cases are considered where the user forcedly pushes in the cassette 71 in the inserting direction, the user needs an inserting force for overcoming the resilience of both the first and second resilient members 41, 65. Normally, this reactionary force is large, and it is therefore difficult to push in the cassette 71. Theoretically, however, in such a state, the end surface of the retaining projection 49 of the first sliding member 40 is brought into contact with the right wall 66 of the retaining hole 48 provided in the second sliding member 39. If the user further pushes in the cassette 71, the first sliding member 40 and the second sliding member 39 tend to move integrally in the direction opposite to the ejecting direction. However, since the drive gear 51 is acting in the ejecting direction, a counter force acts on the first gear portion 50, with the possibility of resulting in that either the first gear portion 50 or the drive gear 51 becomes damaged, or the engagement is canceled. To provide protection against such an incident occurring, in this embodiment, retaining hole 48 of the second sliding member 39 is lengthened an amount corresponding to the length of the gap 67. As a result, even if the user pushes in the cassette 71 from the state shown in FIG. 7, all the load applied by the user is absorbed substantially in the range of horizontal movement. In other words, this is because the area of the length L is equivalent to the length L' corresponding to the horizontally movement of the cassette 71. In this way, when the cassette 71 is pushed in opposition to the driving force at the time of ejection of the cassette 71, the clutching function works effectively at any point in the horizontal stroke.

Figure 8:
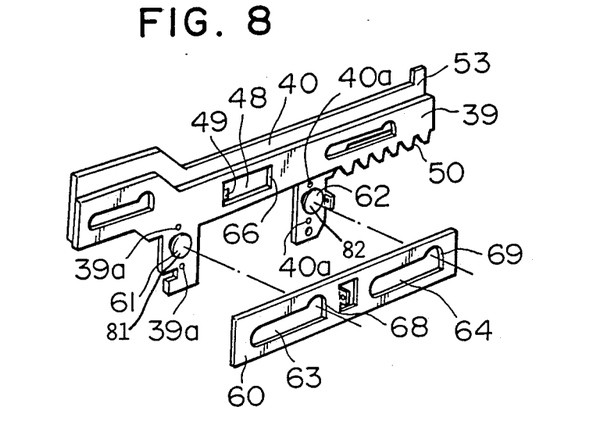
FIGS. 8 and 9 are perspective views of essential portions of still another embodiment of the present invention.
Figure 9:
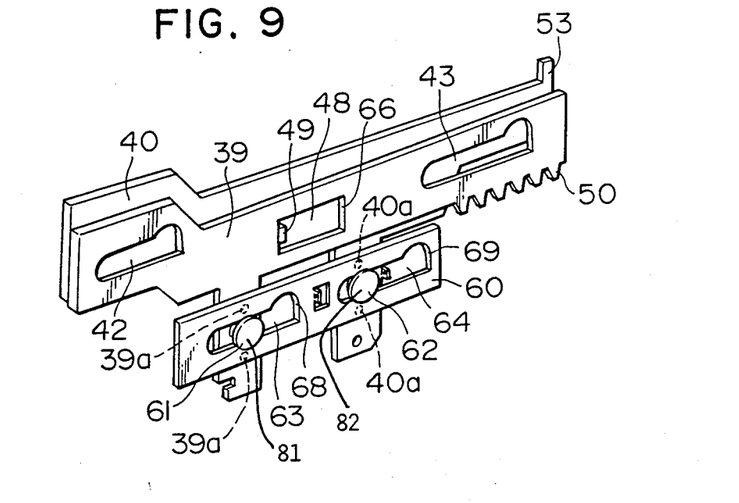

In addition, insertion guide portions 68, 69 formed respectively at the right ends of the first, elongated hole 63 and the second elongated hole 64 both provided in the auxiliary sliding member 60 have configurations which are greater than the diameters of the flange portions 81, 82 of the guide pins 61, 62, as shown in FIG. 8. At the time of the insertion of the guide pins 61, 62 during assembly, these flange portions 81, 82 are fitted in simultaneously, and the auxiliary sliding member 60 is then slid toward the right-hand-side, as shown in FIG. 9. Thus, since the arrangement is such that the insertion guide portions 68, 69 are not used in the normal guiding range, the assembly can be simplified substantially, so that it becomes possible to effect the assembly at low cost.

Projections 40a, 39a are provided on the first and second sliding members 40, 39 so as to ensure that sliding resistance experienced by the auxiliary sliding member 60 when it moves relative to the first and second sliding members 40, 39 will be reduced, and that the auxiliary sliding member 60 will be less subjected to a change in sliding resistance caused by burrs at end surfaces of the first and second sliding members 40, 39 and the auxiliary sliding member 60 as well as a change in their flatness.

The reduction of the sliding resistance and the minimization of a change in it allows the resilience of the first resilient member 41 to be reduced. As a result, it is possible to reduce the inserting force to a low level from the time when the cassette is inserted and until the slide switch 54 is turned on. At the same time, the feel of the inserting force can be improved. Since the projections 39a, 40a are formed integrally on the second and first sliding members 39, 40, respectively, it is possible to reduce the sliding resistance at low cost.

In addition, a similar effect can be obtained if the projections 39a, 40a are provided on the auxiliary sliding member 60 as well.

The second resilient member 65 is extended above a main flat surface of the auxiliary sliding member 60 and is provided at a position in which the second resilient member 65 is shifted from the auxiliary sliding member in the direction orthogonal to the shrinking direction of the first resilient member 41 arranged in such a manner as to allow the first sliding member 40 and the second sliding member 39 to be brought into proximity with each other. This arrangement is adopted so as to reduce the distance between a line of extension of the first resilient member 41 in the shrinking direction and the rotational center of the gear 38 provided on the drive arm 34. The aforementioned distance constitutes a factor determining the thickness of a lower portion of a main body of a video cassette recorder incorporating a cassette loading apparatus when the height of the main body of the video cassette recorder is designed to be lowered. Thus, the aforementioned distance constitutes a major point in design.

What is claimed is:

1. A cassette loading apparatus comprising:
   a pair of side plates, each said side plate having an L-shaped groove,
   a cassette holder for detachably holding a cassette, said cassette holder having guide means for engaging said L-shaped grooves;
   a cassette holder driving means and for driving said cassette holder along said L-shaped grooves between a first position for loading and unloading a cassette and a second position for recording the cassette, said driving means comprising a rotating drive arm which engages said guide means and which drives said cassette holder along said L-shaped grooves when said drive arm rotates;
   a clutch mechanism which engages said driving means and comprises:
   (a) a first sliding member associated with each side plate, said first sliding member being engaged to said side plate so that said first sliding member is free to move in a horizontal direction parallel to the direction that said cassette holder receives a cassette, said first sliding member also engaged to said driving means so that as said driving arm rotates, said first sliding member moves horizontally along said side plate, said first sliding member having a projection extending perpendicularly to the plane in which said first sliding member moves;
   (b) a second sliding member associated with each said side plate, said second sliding member being engaged to said side plate so that second sliding member is free to move in said horizontal direction, said second sliding member having an elongated hole for receiving said projection on said first sliding member said elongated hole having a wall for engaging said projection when said first member has moved a given distance relative to said second member;
   (c) a first resilient member which resiliently connects said second sliding member to said first sliding member:
   (d) an auxiliary sliding member engaged to said first sliding member and said second sliding member by guiding means so that said auxiliary sliding member is free to move in said horizontal direction, said guiding means comprising: a guide pin on said first sliding member, a guide pin on said second sliding member and elongated guide holes for receiving said guide pins;
   (e) a second resilient member which resiliently connects said auxiliary sliding member to said first sliding member, wherein the tension exerted on said second resilient member is greater than the tension exerted on said first resilient member;
   whereby when a cassette is inserted to a given extent into said apparatus, the force necessary to insert the cassette further into said apparatus is instantaneously increased so that the feel of a click is imparted to a user of said apparatus.

2. A cassette loading apparatus as set forth in claim 1, wherein said guide pins on said first and second sliding members have flange portions provided on the free ends of said guide pins, for guiding the motion of said auxiliary sliding member in a direction substantially parallel to the to the planes of motion of said first and second sliding members and said first and second elongated holes in said auxiliary sliding member are provided with guide portions for inserting said flange portions therethrough, said guide portions being larger in diameter than said flange portions.

3. A cassette loading apparatus as set forth in claim 1, wherein said elongated hole in said second sliding member is set to a length such that said projection on said first sliding member does not contact said elongated hole wall prior to said user feeling said click.

4. A cassette loading apparatus as set forth in claim 1, wherein said elongated hole in said second sliding member is set to a length longer than the distance said cassette holder moves prior to said user feeling said click.

5. A cassette loading apparatus as set forth in claim 1, wherein each said side plate has at least two said L-shaped grooves.

6. A cassette loading apparatus as set forth in claim 1, wherein a plurality of projections are provided on at least one of said first sliding member, said second sliding member and said auxiliary sliding member for reducing sliding resistance between said auxiliary sliding member and said first and second sliding members.

7. A cassette loading apparatus as set forth in claim 6, wherein said projections are an integral part of said at least one sliding member.

* * * * *